H. AND L. HOFFMAN.
WATER CONNECTION FOR AUTOMOBILES.
APPLICATION FILED DEC. 10, 1919.

1,337,227.

Patented Apr. 20, 1920.

WITNESS:
Rob R Kitchel

INVENTORS
Harry Hoffman
Louis Hoffman
BY Frank J. Busser
ATTORNEY.

UNITED STATES PATENT OFFICE.

HARRY HOFFMAN AND LOUIS HOFFMAN, OF PHILADELPHIA, PENNSYLVANIA.

WATER CONNECTION FOR AUTOMOBILES.

1,337,227.  Specification of Letters Patent.  Patented Apr. 20, 1920.

Application filed December 10, 1919. Serial No. 343,844.

*To all whom it may concern:*

Be it known that we, HARRY HOFFMAN and LOUIS HOFFMAN, citizens of the United States, residing at Philadelphia, county of Philadelphia, and State of Pennsylvania, have invented a new and useful Improvement in Water Connections for Automobiles, of which the following is a full, clear, and exact description, reference being had to the accompanying drawings, which form a part of this specification.

The object of our invention is to provide a connection for the ends of the water pipes in the cooling systems of automobiles, which will be flexible and adjustable and at the same time of great durability.

The present method of making connection between the ends of water pipes in cooling systems is by the use of lengths of rubber hose, which are slipped over the ends of the pipes and clamped in place by means of clamps. Leakage is prevented by shellacking the ends of the pipes.

The present devices are open to a number of serious objections in that the hot water rots the inner lining of the hose, causing it to drop off and block the system, or parts of it. The action of anti-freezing solutions greatly increases the rotting action. The internal rotting and the action of grease on the outside of the hose softens it to such an extent that when the water is pumped through the system, the suction of the pump constricts the hose and shuts off circulation.

When the hose is removed for any reason, it is usually rendered useless from the necessity of prying it away from the pipes to which it is stuck by the shellac.

The rubber hose requires constant renewal and except when in perfect condition renders inefficient service and is a source of danger to the working of the system.

The connection constructed in accordance with our invention is adaptable to any cooling system and is possessed of the required flexibility, combined with durability, which renders it completely efficient in operation.

We will now proceed to describe our invention in connection with the accompanying drawings in which we have illustrated an embodiment of our invention as applied to the return line from the engine to the radiator of a Ford automobile.

Figure 1:
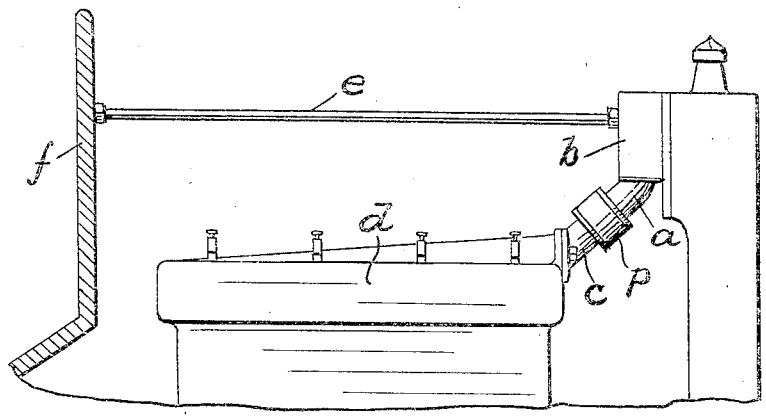
Figure 1 is a partial elevation of an engine and radiator showing the application of our invention.
Figure 2:
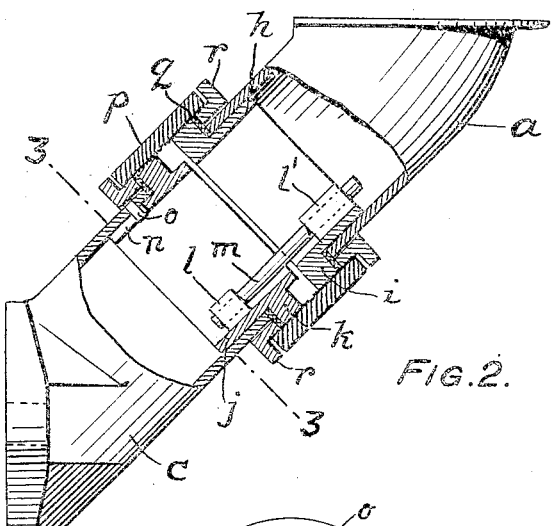
Fig. 2 is a horizontal sectional view of the device embodying our invention applied to a pair of pipes.
Figure 3:
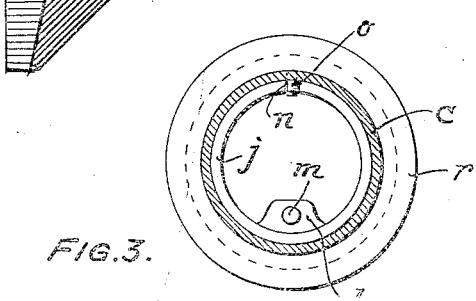
Fig. 3 is a cross-section on lines 3—3 of Fig. 2.

The pipe $a$ extends from the under side of the radiator tank $b$. The pipe $c$ is flanged and bolted to the cylinder head and communicates with the water jackets of the engine $d$. The adjustable radiator rod $e$ extends from the dashboard $f$ to the radiator $g$ and acts to brace the radiator.

The gland $h$ having a flange $i$ at one end is adapted to fit into pipe $a$. A second gland $j$ provided with a flange $k$ is adapted to fit into pipe $c$. The glands are provided with internal shoulders $l$ $l'$ drilled for the reception of a pin $m$ adapted to prevent them from turning relatively to each other. The gland $j$ is provided with a slot $n$ for the reception of a pin $o$ passed through pipe $c$ by which the gland is prevented from turning.

The outside faces of flanges $k$ and $i$ are threaded with a right hand and a left hand thread, respectively. A sleeve $p$ internally threaded, half right hand and half left hand thread, is adapted to engage the threaded flanges of glands $h$ and $j$ and when rotated in one direction, draw them together, and when rotated in the opposite direction, separate them. Washers $q$, or any suitable packing material, are placed between the ends of pipes $a$ and $c$ and flanges $i$ and $k$. Packing nuts $r$, suitably threaded, are engaged in the ends of sleeve $p$.

In operation, the glands are brought together by turning sleeve $p$ and the packing nuts engaged in the ends of the sleeve. The ends of the pipes $a$ and $c$ are inserted between the glands and the packing nuts. The radiator rod $e$ is adjusted to brace the radiator in proper position and the sleeve $p$ turned to spread the glands.

The spreading of the glands causes a tight fit between the washers and the ends of the pipes. After the glands are adjusted the packing nuts are tightened up against the washers and a tight joint obtained.

The glands cannot turn in the pipes in the operation of sleeve $p$ due to the gland $j$ being secured to pipe c by slot n and pin o and to gland h by means of pin m in shoulders l, l'.

Although we have described our invention in connection with the cylinder head outlet connection of a Ford car, it will be understood that it is equally adaptable to any other part or any other car.

Having now fully described our invention, what we claim and desire to protect by Letters Patent is:

1. Means for connecting the separated ends of water pipes in automobiles, comprising glands adapted to enter the respective pipes, and means adapted to separate said glands and effect a water-tight connection between them and their respective pipes.

2. Means for connecting the separated ends of water pipes in automobiles, comprising glands adapted to enter the respective pipes and having oppositely threaded peripheral portions, means holding said glands from turning relatively to the pipes, and a sleeve encircling the glands and threaded thereon, whereby the sleeve closes the opening between the glands and is turnable to separate the glands and force them into water-tight connection with their respective pipes.

3. Means for connecting the separated ends of water pipes in automobiles comprising glands, each gland having a portion adapted to enter its respective pipe and a portion outside such pipe and projecting in a radial direction beyond the periphery of the pipe, the projecting portions of the two glands having oppositely threaded peripheries, a sleeve surrounding the projecting portions of the glands and threaded thereon, washers interposed between the ends of the pipes and the projecting portions of the respective glands, and packing nuts surrounding the respective pipes and surrounded by and in threaded engagement with the sleeve.

4. Means for connecting the separated ends of water pipes in automobiles comprising glands adapted to enter the respective pipes and having oppositely threaded peripheral portions, means connecting the glands comprising members slidable longitudinally one upon another but holding the glands from turning relatively to one another, means holding one gland from turning relatively to its respective pipe but permitting such gland to slide longitudinally, and a sleeve encircling both glands and having oppositely threaded portions engaging the oppositely threaded portions of the respective glands.

5. Means adapted to form a water tight connection with a pipe comprising a gland adapted to engage a pipe, an exteriorly threaded flange on the gland, an internally threaded turnable sleeve surrounding and threaded on said flange, and means to prevent the gland turning with the sleeve.

6. The combination with a pipe, of a gland adapted to enter the end of the pipe, an exteriorly threaded flange on the gland, a turnable sleeve threaded on said flange, means to prevent the gland from turning with the sleeve, a washer between said flange and the pipe end, and a packing nut threaded on the interior thread of the sleeve and extending between the sleeve and the pipe end.

In testimony of which invention, we have hereunto set our hands, at Philadelphia, Pa. on this 8th day of December, 1919.

HARRY HOFFMAN.
LOUIS HOFFMAN.